(12) United States Patent
Smith et al.

(10) Patent No.: US 9,021,028 B2
(45) Date of Patent: Apr. 28, 2015

(54) SYSTEMS AND METHODS FOR SPAM FILTERING

(75) Inventors: Adam Michael Smith, San Francisco, CA (US); Joshua Robert Russell Jacobson, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 663 days.

(21) Appl. No.: 12/535,659

(22) Filed: Aug. 4, 2009

(65) Prior Publication Data

US 2011/0035451 A1 Feb. 10, 2011

(51) Int. Cl.
 G06F 15/16 (2006.01)
 G06Q 10/10 (2012.01)
 H04L 12/58 (2006.01)
(52) U.S. Cl.
 CPC ............ G06Q 10/107 (2013.01); H04L 12/585 (2013.01); H04L 51/12 (2013.01)
(58) Field of Classification Search
 USPC ................... 709/206, 218, 223, 224
 See application file for complete search history.

(56) References Cited

U.S. PATENT DOCUMENTS

| | | | |
|---|---|---|---|
| 6,529,728 B1 | 3/2003 | Pfeffer et al. | |
| 6,615,241 B1 | 9/2003 | Miller et al. | |
| 6,615,348 B1 | 9/2003 | Gibbs | |
| 6,832,245 B1 | 12/2004 | Isaacs et al. | |
| 6,952,805 B1 | 10/2005 | Tafoya et al. | |
| 7,099,853 B1 * | 8/2006 | Liu et al. | 706/45 |
| 7,228,335 B2 | 6/2007 | Caughey | |
| 7,454,470 B1 | 11/2008 | Isaacs et al. | |
| 7,512,788 B2 | 3/2009 | Choi et al. | |
| 7,536,384 B2 | 5/2009 | Venkataraman et al. | |
| 7,539,676 B2 | 5/2009 | Aravamudan | |
| 7,610,341 B2 * | 10/2009 | Daniell | 709/206 |
| 7,610,342 B1 * | 10/2009 | Pettigrew et al. | 709/206 |
| 7,725,492 B2 | 5/2010 | Sittig | |
| 7,743,051 B1 | 6/2010 | Kashyap et al. | |
| 7,788,260 B2 | 8/2010 | Lunt | |
| 7,805,492 B1 | 9/2010 | Thatcher | |
| 7,827,208 B2 | 11/2010 | Bosworth | |
| 7,865,562 B2 | 1/2011 | Nesbitt et al. | |
| 7,870,204 B2 | 1/2011 | LeVasseur et al. | |
| 7,899,806 B2 | 3/2011 | Aravamudan | |
| 7,949,627 B2 | 5/2011 | Aravamudan | |
| 8,086,676 B2 | 12/2011 | Palahnuk et al. | |
| 8,086,968 B2 | 12/2011 | McCaffrey et al. | |

(Continued)

FOREIGN PATENT DOCUMENTS

| | | |
|---|---|---|
| JP | 2003006116 | 1/2003 |
| JP | 2007249307 | 9/2007 |

(Continued)

OTHER PUBLICATIONS

An Approach to Email Categorization with the ME Model, Li etl al, pp. 229-234, AAAI 20007.*

(Continued)

*Primary Examiner* — Rupal Dharia
*Assistant Examiner* — Van Kim T Nguyen
(74) *Attorney, Agent, or Firm* — James J. DeCarlo; Greenberg Traurig, LLP

(57) ABSTRACT

Systems and methods to reduce false positives in spam filtering. In one aspect, a method includes automatically generating profiles for persons identified in messages, such as incoming and outgoing emails. Messages flagged as spam can be checked against the profile to identify false positives.

16 Claims, 5 Drawing Sheets

(56) References Cited

U.S. PATENT DOCUMENTS

| | | | |
|---|---|---|---|
| 8,170,189 B2* | 5/2012 | Alperin et al. | 379/142.14 |
| 8,572,191 B2 | 10/2013 | Bonforte | |
| 2002/0087647 A1 | 7/2002 | Quine et al. | |
| 2002/0103873 A1 | 8/2002 | Ramanathan et al. | |
| 2002/0103879 A1 | 8/2002 | Mondragon | |
| 2003/0028525 A1 | 2/2003 | Santos et al. | |
| 2004/0034537 A1 | 2/2004 | Gengarella et al. | |
| 2004/0143635 A1* | 7/2004 | Galea | 709/206 |
| 2004/0236838 A1* | 11/2004 | Tout | 709/207 |
| 2005/0041789 A1* | 2/2005 | Warren-Smith et al. | 379/93.24 |
| 2005/0055409 A1 | 3/2005 | Alsarraf et al. | |
| 2005/0166160 A1 | 7/2005 | Bergstrom et al. | |
| 2005/0262208 A1* | 11/2005 | Haviv et al. | 709/206 |
| 2006/0004892 A1 | 1/2006 | Lunt | |
| 2006/0031483 A1* | 2/2006 | Lund et al. | 709/224 |
| 2006/0168024 A1* | 7/2006 | Mehr et al. | 709/206 |
| 2006/0203811 A1 | 9/2006 | Aoki et al. | |
| 2007/0022447 A1 | 1/2007 | Arseneau et al. | |
| 2007/0123222 A1 | 5/2007 | Cox et al. | |
| 2007/0214141 A1 | 9/2007 | Sittig | |
| 2007/0288578 A1 | 12/2007 | Pantalone | |
| 2008/0031228 A1 | 2/2008 | Gallant | |
| 2008/0040370 A1 | 2/2008 | Bosworth | |
| 2008/0040435 A1 | 2/2008 | Buschi et al. | |
| 2008/0040474 A1 | 2/2008 | Zuckerberg | |
| 2008/0040475 A1 | 2/2008 | Bosworth | |
| 2008/0162347 A1 | 7/2008 | Wagner | |
| 2009/0029674 A1 | 1/2009 | Brezina et al. | |
| 2009/0030872 A1 | 1/2009 | Brezina et al. | |
| 2009/0030919 A1 | 1/2009 | Brezina et al. | |
| 2009/0030933 A1 | 1/2009 | Brezina et al. | |
| 2009/0030940 A1 | 1/2009 | Brezina et al. | |
| 2009/0031232 A1 | 1/2009 | Brezina et al. | |
| 2009/0031244 A1 | 1/2009 | Brezina et al. | |
| 2009/0031245 A1 | 1/2009 | Brezina et al. | |
| 2009/0070412 A1 | 3/2009 | D'Angelo | |
| 2009/0106415 A1 | 4/2009 | Brezina et al. | |
| 2009/0106676 A1 | 4/2009 | Brezina et al. | |
| 2009/0119678 A1 | 5/2009 | Shih et al. | |
| 2009/0132395 A1 | 5/2009 | Lam et al. | |
| 2009/0157717 A1 | 6/2009 | Palahnuk et al. | |
| 2009/0177754 A1 | 7/2009 | Brezina et al. | |
| 2009/0182788 A1 | 7/2009 | Chung et al. | |
| 2009/0198688 A1 | 8/2009 | Venkataraman et al. | |
| 2009/0234925 A1 | 9/2009 | Seippel, III et al. | |
| 2009/0254858 A1 | 10/2009 | McCaffrey et al. | |
| 2009/0267728 A1 | 10/2009 | Mayrand | |
| 2009/0282047 A1* | 11/2009 | Lin et al. | 707/10 |
| 2009/0292776 A1 | 11/2009 | Nesbitt et al. | |
| 2010/0015976 A1 | 1/2010 | Issa et al. | |
| 2010/0017476 A1* | 1/2010 | Shue | 709/206 |
| 2010/0030715 A1 | 2/2010 | Eustice et al. | |
| 2010/0049534 A1 | 2/2010 | Whitnah | |
| 2010/0164957 A1 | 7/2010 | Lindsay | |
| 2010/0169327 A1 | 7/2010 | Lindsay | |
| 2010/0185610 A1 | 7/2010 | Lunt | |
| 2010/0229223 A1 | 9/2010 | Shepard | |
| 2010/0248681 A1 | 9/2010 | Phills | |
| 2010/0306185 A1 | 12/2010 | Smith | |
| 2011/0029620 A1* | 2/2011 | Bonforte | 709/206 |
| 2011/0087969 A1 | 4/2011 | Hein et al. | |
| 2012/0150978 A1 | 6/2012 | Monaco et al. | |
| 2012/0215861 A1 | 8/2012 | Smith | |
| 2014/0052803 A1 | 2/2014 | Bonforte | |
| 2014/0052804 A1 | 2/2014 | Bonforte | |

FOREIGN PATENT DOCUMENTS

| | | |
|---|---|---|
| KR | 1020090112257 | 10/2009 |
| WO | 2012082929 | 6/2012 |

OTHER PUBLICATIONS

A Bayesian Approach to Filtering Junk E-mail, Sahami et al., AAAI Workshop on Learning for Text Categorization, Jul. 1998, Madison, Wisconsin, AAAI Technical Report WS-98-05.*

Spam Guru: An Enterprise Anti-Spam Filtering System, Segal et al., IBM Thomas J. Watson Research Center, 2004.ap.*

Spam Filtering Techniques, Six approaches to eliminating unwanted email, develop Works, David Mertz, Sep. 1, 2002.*

Sender Reputation in a Large Webmail Service, Google, CEAS 2006 conference.*

Known Sender Finder, Josh Levine, Jan. 1, 2006.*

International Patent Application PCT/US10/52081, International Search Report and Written Opinion, May 20, 2011.

International Patent Application PCT/US11/64958, International Search Report and Written Opinion, Jul. 31, 2012.

European Patent Application No. 11848233.0, Extended Search Report, Mar. 27, 2014.

* cited by examiner

SYSTEMS AND METHODS FOR SPAM FILTERING

FIELD OF THE TECHNOLOGY

At least some embodiments of the disclosure relate to user interfaces in general and, more particularly but not limited to, user interfaces for presenting incoming communications, such as email messages, instant messages, and text messages.

BACKGROUND

Many systems and applications have been developed to allow people to communicate with each other. Such systems and applications may provide communication via emails, instant messages, text messages, web/online postings, etc.

Email systems typically use servers to receive the electronic messages from the senders, to store and/or forward the messages on behalf of the senders, and to deliver the messages to the recipients. Since the servers can store the messages for a period of time before delivery, a recipient and a sender do not have to establish a direct communication connection to facilitate the transmission of the electronic message. Thus, the sender and the recipient do not have to be online simultaneously for email communications.

In an email system, an email client application is typically used to receive and display messages and to compose and send messages. The email client application communicates with one or more email servers to receive and send messages. Email addresses are used to identify the recipients of the messages.

An email client application may be a stand alone application running on a user terminal (e.g., a personal desktop or portable computer, a personal digital assistant (PDA), or a smart phone). The email client application stores messages received from one or more email servers, and can display the stored messages to a user even when the user terminal is not connected to the network.

An email client application may also be implemented in part via a server. The server stores the messages on behalf of a user, and when requested, formats a message as a web page for display on a browser used by the user.

Instant messaging (IM) allows real-time communication between people. A communication connection between the devices of the participants in an instant messaging session is required for the delivery of the instant messages sent during the session. User names are typically used to identify the online presence and thus the online addresses (e.g., Internet Protocol (IP) addresses) of the users, which are used to establish the communication connections for the instant messaging session. Therefore, the user names of instant messaging systems can be considered as the addresses for establishing online connections for instant messaging sessions, from the point of view of the users.

Text messaging allows users to communicate via mobile phones over a cellular communications network. Text messages are typically transmitted via Short Message Service (SMS) or Multimedia Messaging Service (MMS). The phone numbers of the mobile phones are used as the addresses of the recipients of the text messages.

Some user terminals (e.g., personal computers, PDA, mobile phones) may support communications in multiple modes, such as email, instant messages, and text messages.

Some applications have been developed to organize address information for users. For example, an address application may store information about a plurality of persons. For each of the persons, the address application may store the name of the person, the email address of the person, the street address of the person, the IM address of the person, the web page address of the person, phone numbers of the person, etc. A person may have several distinct email addresses used concurrently to receive email messages.

Electronic messaging systems may be abused to send unsolicited bulk messages indiscriminately. Such messages may be considered spam; and some systems and applications have been developed in an effort to identify and filter out spam messages.

However, a spam filter may falsely identify a message as spam and thus may cause the user to lose messages. Some email systems allow their users to add the email addresses of their friends in an address book associated with the corresponding email system to avoid or reduce the chances that the emails from their friends are falsely identified as spam.

SUMMARY OF THE DESCRIPTION

Systems and methods are provided to reduce false positives in spam filtering. Some embodiments are summarized in this section.

In one embodiment, a computer implemented method includes: scanning, by a computer, a set of messages that are classified by a spam filter as spam; determining, by the computer, one or more false positive spam messages from the set of messages classified as spam; and presenting, by the computer, a list to identify the one or more false positive spam messages to a user.

In one embodiment, a user terminal includes: a storage device to store for a user a first set of messages and a second set of messages, the second set of messages being classified by a spam filter as spam; a profile builder to scan the first set of messages to identify a plurality of addresses, and to identify names of persons at the addresses to generate profiles of the persons; and a false spam rescuer to compare addresses used in the second set of messages with addresses in the profiles, and to identify a false positive in the second set of messages in spam filtering if a message in the second set of messages is from an address in the profiles.

In one embodiment, a method includes: scanning, by a processor in an automated way, a set of messages of a user to identify a plurality of addresses used in the messages; identifying names of persons at the addresses to generate profiles of the persons; and filtering spam messages out of incoming messages for the user using the profiles.

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In one embodiment, a user terminal is configured to reduce the false positive problem of spam filtering by comparing the sender and recipients on an incoming message (e.g., an email message, a text message, etc.) to the addresses in a set of profiles of persons. The profiles are generated based on scanning the messages of the user in an automatic way. The profiles may be established based on messages in different accounts of the user and/or different types of messages (e.g., instant messages, social network postings, text messages, emails, etc.).

For example, if the user corresponds with a person using a personal email account, a profile of the person is generated automatically by a profile builder. When the user receives messages in a work email account, the profile of the person can be used to ensure that the messages from the same person are not flagged as spam (or can be flagged as non-spam, if they are delivered into a spam folder by a spam filter).

Thus, the user does not have to manually add the address of the person into the official address book of the email system to prevent the spam filter from delivering the emails from the person into a spam folder.

In some embodiments, the profiles can be configured to be part of the address book used by the spam filter to identify spam messages.

Figure 1:
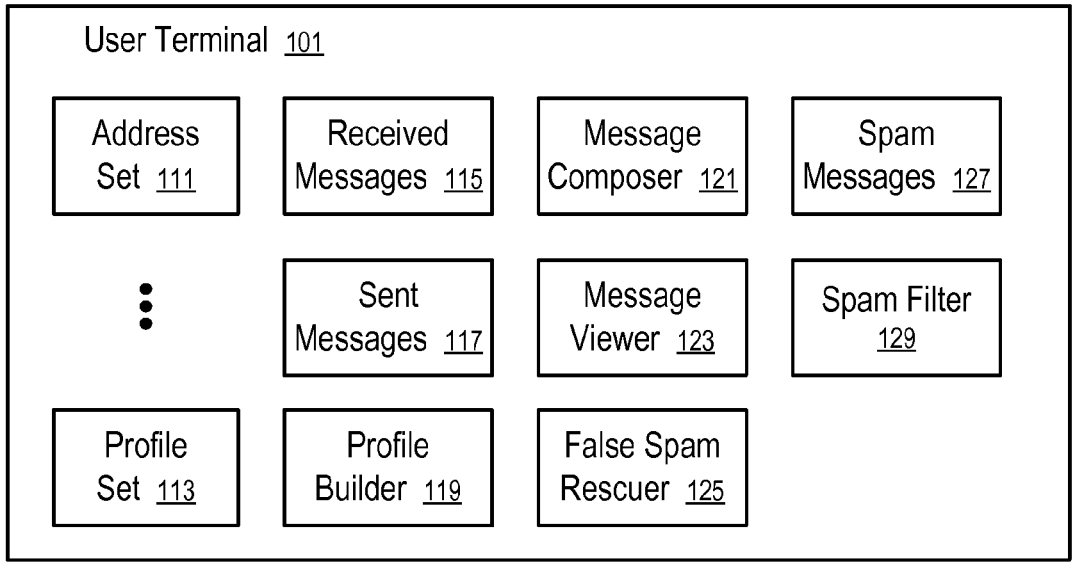
FIG. 1 shows a user terminal to improve spam filtering according to one embodiment.

FIG. 1 shows a user terminal (101) to improve spam filtering according to one embodiment. The user terminal (101) may be implemented as a personal computer, a web enabled television set, a personal digital assistant (PDA), or a mobile phone, using special purpose hardware (Application-Specific Integrated Circuit (ASIC) or Field-Programmable Gate Array (FPGA)), software and a general purpose processor, or a combination of special purpose hardware and software. Thus, the disclosure is not limited to a particular implementation.

In FIG. 1, the user terminal (101) is configured to store the messages (115) received at the user terminal (101) and the messages (117) sent from the user terminal (101). The user terminal (101) includes a message viewer (123) which can be used to display a message selected from the received messages (115) or selected from the sent messages (117).

In FIG. 1, the user terminal (101) further includes a message composer (121) which is configured to present a user interface to facilitate the composition of an outgoing message.

In one embodiment, the user terminal (101) has an address set (111) (e.g., an electronic address book) which is used by the spam filter (129) to identify spam messages (127). The spam filter (129) uses a set of rules to identify the spam messages (127) from the incoming messages so that the spam messages (127) are presented separately from the received messages (115) that are not considered spam messages.

In one embodiment, the address set (111) is manually managed by the user. For example, an address is added to the address set (111) only when the user decides to add the address to the set (111). In some embodiments, when a message is from an address listed in the address set (111), the spam filter (129) does not flag the message as spam.

However, the spam filter (129) may have a false positive problem in which a normal message may be falsely flagged as spam.

In FIG. 1, a false spam rescuer (125) is configured to identify the candidates of false positive spam messages using the profile set (113) established and maintained in an automated way by the profile builder (119).

In one embodiment, the profile builder (119) is configured to extract profile data of various persons based on the received messages (115) and the sent messages (117). The profile builder (119) can extract information about persons not only from the headers of the messages where the senders and the recipients of the messages are specified, but also from the bodies of the messages and from other online sources, such as online directories, social networking websites, web pages, result pages found by search engines, etc.

Since the profile builder (119) obtains the profile data for various persons referenced in the messages (115 and 117), the profile set (113) is more comprehensive than the address set (111).

Since the profile builder (119) collects the profile data in an automated way, the false spam rescuer (125) can improve the false positive problem of the spam filter (129), without requiring the user to manually add addresses to the address set (111).

In one embodiment, the profile builder (119) is configured to scan the received messages (115) and the sent messages (117) for email addresses and names associated with the email addresses. The profile builder (119) generates a profile for each person identified to create the profile set (113). When new messages are received or sent, the profile set (113) is updated based on the new messages.

In some embodiments, the profile builder (119) may further identify persons based on scanning the received messages (115) and the sent messages (117) for phone numbers, names, addresses, etc.

In some embodiments, some or all of the components (111-129) in the user terminal (101) may be hosted on a server remote to the user terminal (101) (e.g., accessible via a website and a web browser). For example, in one embodiment, the received messages (115) and the sent messages (117) may be hosted on a web site; and the user can use a web browser to view a selected one of the messages (115 and 117).

For example, the profile builder (119) may be configured to communicate with the server to extract the profile set (113) from the messages (115 and 117) hosted on the server. Alternatively, the profiler builder (119) may also be hosted on the server to build the profile set (113) on the server.

In some embodiments, the spam filter (129) and the spam messages (127) are also hosted on the server remote to the user terminal (101). The user terminal (101) may be used to view a list of the spam messages (127) via a web browser.

In one embodiment, the false spam rescuer (125) flags a message in the spam messages (127) as false positive to bring to the attention of the user the message which may be falsely flagged as spam. In other embodiments, the false spam rescuer (125) automatically removes the spam flag from the message so that the message is re-filed/classified as one of the received messages (115).

In some embodiments, the false spam rescuer (125) further ranks the addresses and/or the persons at the addresses to determine relevancy scores of the addresses and/or the persons relative to the user of the user terminal (101). The relevancy scores can be used by the false spam rescuer (125) to rank the spam messages (127) that are identified as possible false positive spam messages.

In one embodiment, when the relevancy of a spam message is higher than a threshold, the spam message can be moved automatically by the false spam rescuer (125) from the set of spam messages (127) (e.g., a spam folder) to the set of received messages (115) (e.g., in an inbox).

In some embodiments, the false spam rescuer (125) ranks and presents the spam messages (127) in an order according to the relevancy score. Thus, the user can process the most likely false positive spam messages first.

Figure 2:
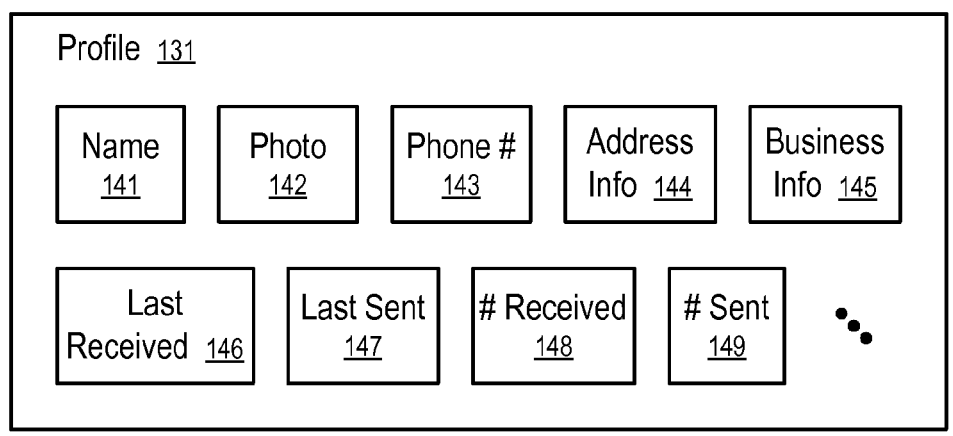
FIG. 2 illustrates a profile of a person according to one embodiment.

FIG. 2 illustrates a profile of a person according to one embodiment. In FIG. 2, the profile (131) includes various fields, such as the name (141) of the person, a photo image (142) of the person, one or more phone numbers of the person (143), address information (144) (e.g., email address, IM address, street address), business information (145) (e.g., employer, work address, job title), the date and time of the last message received from the person (146), the date and time of the last message sent to the person (147), the total number of messages received from the person (148), the total number of messages sent to the person (149), etc. The profile (131) may also include information obtained from other data sources, such social networks. For example, the profile (131) may include the count of friends of the person on a social network website (e.g., www.facebook.com or www.linkedin.com).

In one embodiment, the profile builder (119) obtains at least some of the information for the fields from the received messages (115) or the sent messages (117) to identify the person, and then uses other information sources to obtain the data for the other fields in an automated way to collect the profile information on behalf of the user.

For example, the profile builder (119) may use social networks, search engines, photo services, etc. to obtain the photo (142), the business information (145), etc.

Figure 3:
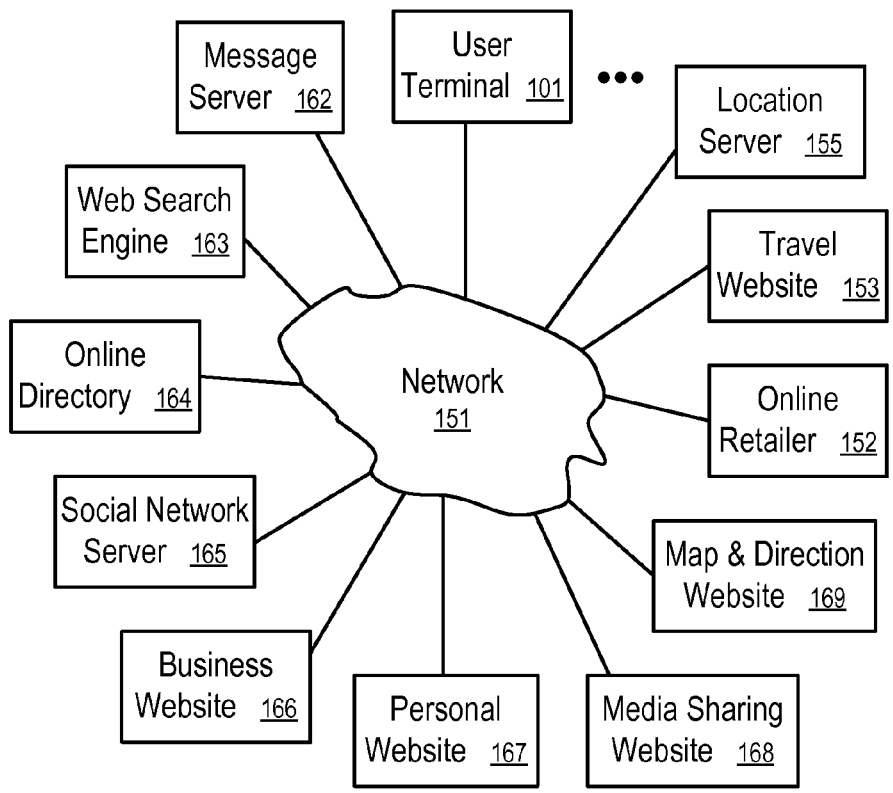
FIG. 3 illustrates a system to obtain data for a profile according to one embodiment.

FIG. 3 illustrates a system to obtain data for a profile according to one embodiment. In FIG. 3, under the control of the profile builder (119), the user terminal (101) may communicate with various servers in an automated way to extract data for the profile (131) over the network (151). The network (151) may include a local area network, a cellular telecommunications network, a wireless wide area network, a wireless local area network, a wireless personal area network, an intranet, and/or Internet.

In one embodiment, the user terminal (101) communicates with the message server (162) to receive and send the messages (115 and 117).

In one embodiment, after the profile builder (119) extracts from the messages (115 or 117) certain information (e.g., an email address, an IM user name, a phone number, and/or a name) about a person, the profile builder (119) uses the extracted information to query various servers to obtain further information (e.g., photo (142), phone number (143), address information (144), and/or business information (145)) about the person to create the profile (131).

For example, the user terminal (101) may query a web search engine (163), an online directory (164), a social network server (165), a business website (166), a personal website (167), a media sharing website (168), a map and direction web site (169), an online retailer (152), a travel website (153), a location website (155), and/or other servers. Information that can be used as search criteria include names, screen names, social network profile names, social network profile URLs, physical addresses, website URLs, email addresses, or telephone numbers. Information that is collected as a result of these queries may be used in future searches to identify additional information that may be used to create a person profile.

For example, the user terminal (101) may receive an email sent by a person via the message server (162). The profile builder (119) of the user terminal (101) is configured to perform a search using the web search engine (163) with the email address of the person as the search criteria. The search engine (163) may return a search result that includes the phone number (143) of the person. The profile builder (119) extracts the phone number (143) from the search result and stores the phone number (143) as part of the profile (131) of the person. The search engine (163) may also return the URL for or link to a personal website (167) belonging to the person. The personal website (167) may contain additional information about the person that may be used to create a person profile, such as additional contact information or biographical information.

In another example, the email address belonging to the person may include an extension (or domain name) for a company. The profile builder (119) of the user terminal (101) is configured to perform a search using the search engine (163) with the email extension (or domain name) as the search criteria. A result returned by the search may be a business website (166). The profile builder (119) of the user terminal (101) is further configured to search the business website (166) to obtain information relevant to the profile (131) of the person. For example, a web page on the business website (166) may contain additional information about the person that may be used to create a person profile, such as business information (145), additional contact information or biographical information.

In another example, the profile builder (119) of the user terminal (101) is configured to perform a search using an online directory (164) (e.g., a person search directory, a yellow page directory) with the name (141) of the person or other contact information as the search criteria. The online directory (164) may return search results that include additional contact information and other information that may be used for the profile (131) of the person.

In another example, the user terminal (101) may receive an email sent by the person via the message server (162). The email may contain a social network user name for the person. The profile builder (119) of the user terminal (101) is configured to extract this social network user name from the email and use it to access the social network server (165). A webpage on the social network server (165) may contain additional contact information and other information that may be extracted and used by the profile builder (119) to create the profile (131) of the person. The webpage on the social network server (165) may also contain additional contacts that may be associated with the person in the profile (131). For example, persons on the friends list of the webpage on the social network server (165), or persons who have posted comments or messages on the social network server (165) may be listed as contacts in a contact network for the person.

In another example, a search performed using the search engine (163) may return a URL or link for a media sharing website (168) (e.g., for sharing photos or videos). The media sharing website (168) may store profile information about the person. Thus, the profile builder (119) of the user terminal (101) can extract additional contact information or biographical information from the media sharing website (168) for the creation of the profile (131) of the person. For example, a profile belonging to the person on a video sharing website may include an instant message screen name (user name) for the person. This screen name may be extracted and displayed as part of the profile (131) of the person.

In one embodiment, information extracted from communications between the person and other users may also be used to update profile information on a social network server (165) or other websites. For example, the profile builder (119) of the user terminal (101) may detect that the person has primarily used email address "david@foo.com" in recent communications, whereas the profile of the person on the social network server (165) shows his email address as "david@bar.com." The profile builder (119) of the user terminal (101) can share the new email address of the person with the social network server (165) to allow the social network server (165) to automatically update the corresponding information about the person, or to suggest the person make an update based on this changed behavior detected by the profile builder (119) of the user terminal (101).

In one embodiment, the profile builder (119) of the user terminal (101) can also extract information about the person from the travel website (153) and the online retailer (152) for the creation of the profile (131) of the person. For example, after an email containing information about a flight itinerary is received in the user terminal (101), the profile builder (119) of the user terminal (101) may extract a flight number or other information about a flight from the email. The profile builder (119) of user terminal (101) then queries the travel website (153) using the flight number or other flight information as search criteria. Information about the flight, such as the destination city or the departure city, expected departure time, expected arrival time, expected delays, weather in the destination city, weather in the departure city, or any changes to the flight may be used as part of the profile (131) of the person.

In another example, an email containing information about an item or service that the second user is interested in purchasing may be received in the user terminal (101). The profile builder (119) of user terminal (101) is configured to query one or more search engines, websites, or on-line retailers (152) to determine which retailer or website has the best price or currently has the item in stock or the service available. This information is extracted by the profile builder (119) and displayed as part of the profile (131) of the person.

In one embodiment, the profile builder (119) of the user terminal (101) can also extract information from a map and direction website (169) and location servers (155) as part of the profile (131) of the person. For example, the person may own a GPS unit, cell phone, or other device that is capable of transmitting the person's current physical location to the location server (155), which allows other users to access the person's current location information. If the user of the user terminal (101) has permission to view the location information of the person, the profile builder (119) of the user terminal (101) may access the location server (155) over the network (151) to receive location information about the person. This location information can be displayed as part of a person profile.

The profile builder (119) of the user terminal (101) may also access the map and direction website (169) to create a map of the current location of the person, or to generate directions to the current location of the person. The map or directions may be displayed as part of the profile (131) of the person. The map and direction website (169) may also be used to generate a map or directions to one or more known street addresses of the person, such as a work address or home address. The map or directions can be displayed as part of the profile (131) of the person.

Figure 4:
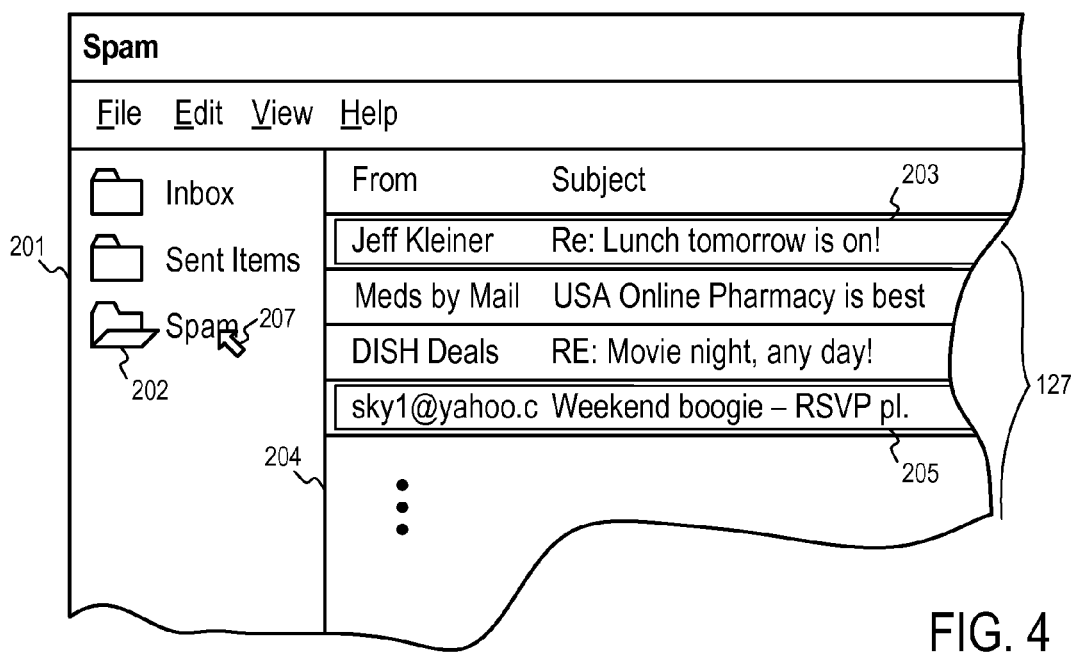
FIG. 4 illustrates a user interface to highlight messages in a spam folder according to one embodiment.

FIG. 4 illustrates a user interface (201) to highlight messages in a spam folder according to one embodiment. In FIG. 4, the spam folder (202) represents the spam messages (127) that are flagged as spam by the spam filter (129). When the user uses the cursor (207) to select the spam folder (202), the list of the spam messages (127) is presented in the panel (204).

In FIG. 4, the messages (e.g., 203 and 205) which are identified by the false spam rescuer (125) as false positive spam messages are highlighted.

In other embodiments, the messages (e.g., 203 and 205) which are identified by the false spam rescuer (125) as false positive spam messages can be displayed as a list separate from other spam messages (127).

In some embodiments, the user interface (201) may further present a control (e.g., an icon button, or a link, not shown in FIG. 4), which can be selected to move all the messages (e.g., 203 and 205) which are identified by the false spam rescuer (125) as false positive spam messages to the inbox.

In some embodiments, the user interface (201) may further present a control (e.g., an icon button, or a link, not shown in FIG. 4), which can be selected to sort the spam messages (127) according to their likelihood of being false positive.

In one embodiment, the false spam rescuer (125) compares the addresses and/or names used in the spam messages (127) with the corresponding information in the profile set (113) to identify the messages (e.g., 203 and 205) which may be false positive spam messages.

For example, when the address or the name of the sender of a message in the spam messages (127) is in the profile set (113), the message can be flagged by the false spam rescuer (125) as false positive.

For example, when the address or the name of a recipient of a message in the spam messages (127) is in the profile set (113), the message can be flagged by the false spam rescuer (125) as false positive.

In one embodiment, after the false positive spam messages (e.g., 203 and 205) are moved from the spam folder (202) to the inbox (e.g., automatically by the false spam rescuer (125), or in response to a command from the user), the false positive spam messages (e.g., 203 and 205) are flagged and/or highlighted when the messages in the inbox are listed.

Thus, when a person is referenced in the messages (e.g., 115 and 117) that are indicated by the user as not spam (e.g., via the user sending the messages, or receiving, reading and keeping the messages), messages from the person (or referencing the person) can be rescued from the spam messages (127) that are filtered out of the incoming messages by the spam filter (129).

Figure 5:
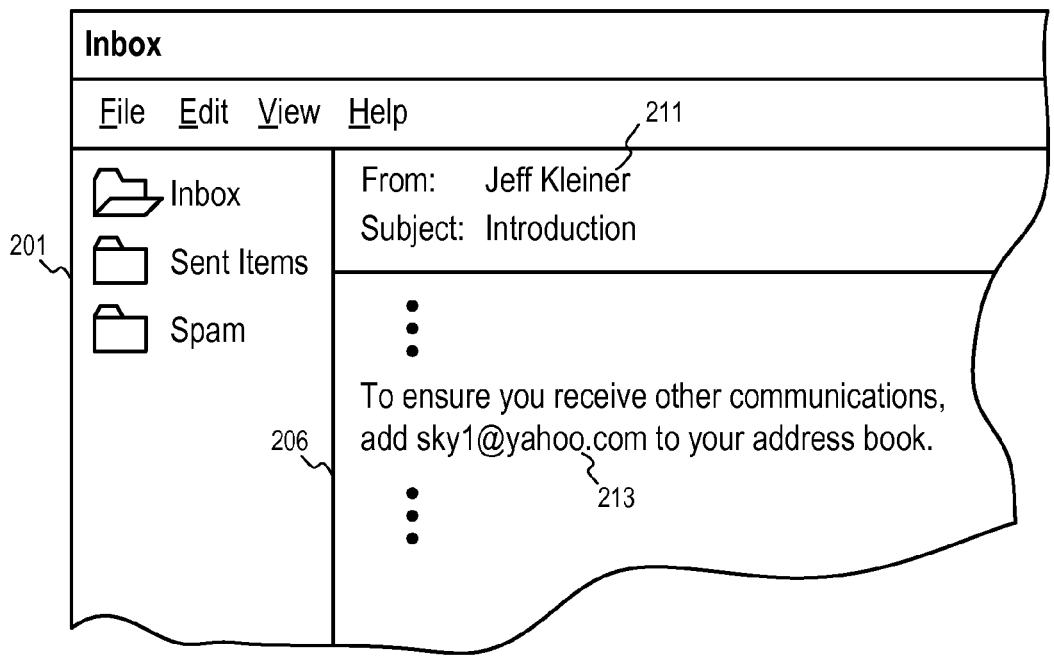
FIG. 5 shows an example to obtain addresses to improve spam filtering according to one embodiment.

FIG. 5 shows an example to obtain addresses to improve spam filtering according to one embodiment. For example, after the user views the message displayed in the panel (206) and leaves the message in the inbox, the profile builder (119) may automatically determine that the address of the sender (211) and the address (213) referenced in the message can be used by the false spam rescuer (125) to identify false positives in spam filtering. When a spam message is from the sender (211), or from the address (213), the false spam rescuer (125) can flag the spam message as false positive (e.g., as illustrated in FIG. 4). Thus, the user does not have to manually add the address of the sender (211), or the address (213) mentioned in the message, to the address set (111) to prevent the messages from the sender (211) or the address (213) from being buried in the spam messages (127).

Figure 6:
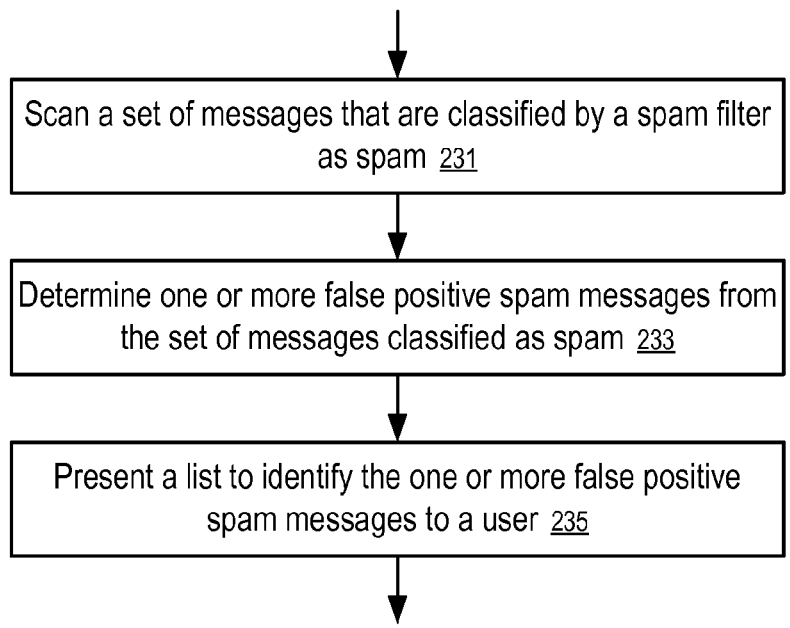
FIG. 6 shows a method to improve spam filtering according to one embodiment.

FIG. 6 shows a method to improve spam filtering according to one embodiment. In FIG. 6, the false spam rescuer (125) scans (231) a set of messages that are classified by a spam filter (129) as spam to determine (233) one or more false positive spam messages from the set of messages classified as spam. The user terminal presents (235) a list to identify the one or more false positive spam messages to a user.

For example, the false spam rescuer (125) may highlight the one or more false positive spam messages when a list of the set of messages (127) that are classified as spam by the spam filter (129) is presented, as illustrated in FIG. 4.

In one embodiment, the false spam rescuer (125) moves the one or more false positive spam messages (e.g., 203 and 205) out of the set of messages (127) that are classified as spam by the spam filter (129), in response to a single command from a user of the user terminal (101), or automatically in response to the user terminal (101) receiving the one or more messages (e.g., 203 and 205) and determining that the one or more messages (e.g., 203 and 205) are false positive in spam filtering.

For example, the false spam rescuer (125) may move the false positive spam messages (203 and 205) to the inbox for the received messages (115) or a separate folder. In one embodiment, after the false positive spam messages (203 and 205) are moved automatically by the user to the inbox (e.g., without an explicit command from the user to move the messages), the false positive spam messages (203 and 205) are flagged to allow the false positive spam messages (203 and 205) to be highlighted when the list of incoming messages in the inbox is presented on the user terminal (101).

In one embodiment, the profile builder (119) establishes and maintains the profile set (113) in an automatic way, based on the messages that are implicitly indicated by the user as non-spam messages (e.g., received messages (115) and sent messages (117)). The false spam rescuer (125) uses the profile set (113) to identify spam messages that reference the persons in the profile set (113), such as messages from persons listed in the profile set (113), messages from addresses listed in the profile set (113), messages addressed to persons listed in the profile set (113) (e.g., in addition to addressed to the user of the user terminal (101)), messages sent to addresses listed in the profile set (113) (e.g., in addition to sent to the address of the user of the user terminal (101)), or messages containing references to the persons or addresses found in the profile set (113).

Figure 7:
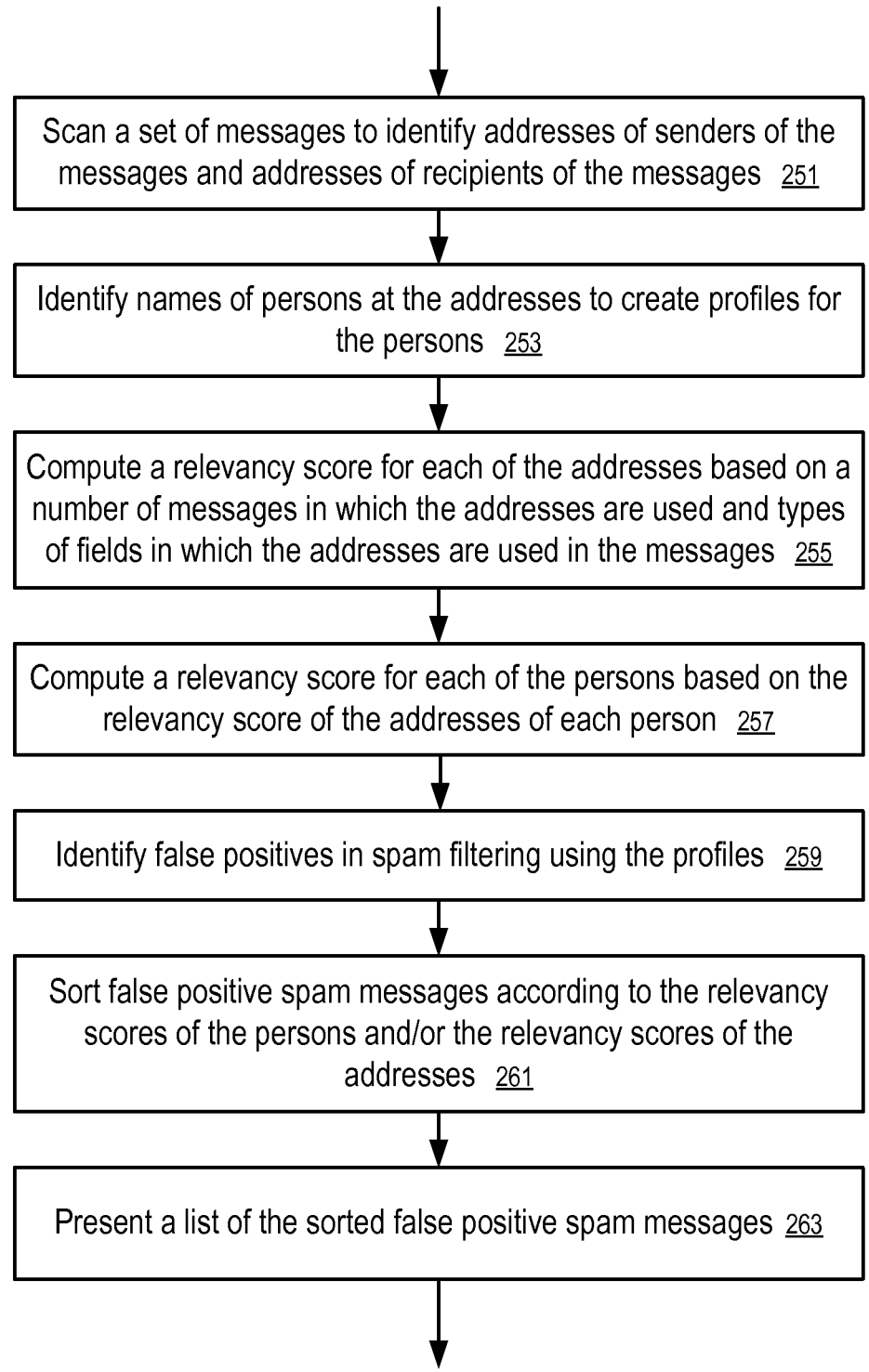
FIG. 7 shows another method to improve spam filtering according to one embodiment.

FIG. 7 shows another method to improve spam filtering according to one embodiment.

In FIG. 7, the profile builder (119) scans (251) a set of messages (115 and 117) to identify addresses of senders of the messages and addresses of recipients of the messages in an automatic way, for example, when the profile builder (119) is installed and/or when the messages (115 and 117) are received or sent.

The profile builder (119) identifies (253) the names of persons at the addresses to create profiles (131) of the persons, based on scanning the messages (115 and 117) and/or querying other data sources in an automated way, such as the web search engine (163), online directory (164), social network server (165), and other websites.

In one embodiment, the profile builder (119) computes (255) a relevancy score for each of the addresses based on a number of messages in which the addresses are used and types of fields in which the addresses are used in the messages. For example, instances where an address is used to specify a recipient of a message sent from the user of the user terminal (101) may be given more weight than instances where the address is used to specify a sender of a message received by the user of the user terminal (101).

In one embodiment, the profile builder (119) also computes (257) a relevancy score for each of the persons based on the relevancy score of the addresses of each person.

In FIG. 7, the false spam rescuer (125) uses the profiles to identify (259) false positives in spam filtering. For example, when there is match between a person or address mentioned in a spam message and the corresponding person or address in the profile set (113), the false spam rescuer (125) can flag the spam message as false positive.

The false spam rescuer (125) may sort (261) false positive spam messages according to the relevancy scores of the persons and/or the relevancy scores of the addresses and present (263) a list of the sorted false positive spam messages to the user of the user terminal (101).

In one embodiment, the profile builder (119) determines the relevancy scores based on the received messages (115) and the sent messages (117).

In one embodiment, the false spam rescuer (125) includes a supervised learner which uses a machine learning technique to learn identifying false positives from training data. For example, when the sender of a spam message (127) has more than a predetermined number of friends on a social network website hosted on the social network server (165), the false spam rescuer (125) may identify the spam message (127) as a false positive. The supervised learner may adjust the predetermined number based on input obtained from the user. For example, when the user accepts a determination by the false spam rescuer (125) that a spam message (127) is a false positive (e.g., by reading and keeping the message (127)), the false spam rescuer (125) can use the acceptance by the user as a training data point. For example, when the user rejects a determination by the false spam rescuer (125) that a spam message (127) is a false positive (e.g., by deleting the message (127)), the false spam rescuer (125) can use the rejection by the user as a training data point. For example, when the user accepts a determination by the false spam rescuer (125) that a spam message (127) is not a false positive (e.g., by reading and then deleting the message (127)), the false spam rescuer (125) can use the acceptance by the user as a training data point. For example, when the user rejects a determination by the false spam rescuer (125) that a spam message (127) is not a false positive (e.g., by reading and keeping the message (127)), the false spam rescuer (125) can use the rejection by the user as a training data point.

In one embodiment, the false spam rescuer (125) is configured to avoid identifying a spam message (217) as a false positive, when the sender of the spam message (217) appears to be spoofed. For example, when the sender of the spam message (217) appears to be the user himself or herself, the spam message (217) may not be identified as a false positive without having a signature the user typically sends. Similarly, the signatures of various persons in the profile set (113) can be used to determine whether the spam messages (217) have spoofed senders. When a spam message (217) appears to have a spoofed sender, the false spam rescuer (125) may not identify the spam message (217) for rescuer. In some embodiment, when a spam message (217) appears to have a spoofed sender, the relevancy score of the sender is given a low weight.

In one embodiment, the false spam rescuer (125) determines whether or not the address of the sender is a distribution list (or an email listed publically on the Internet or in Internet search engines). When the address of the sender is a distribution list (or an email listed publically on the Internet or in Internet search engines), the false spam rescuer (125) may not identify the spam message (217) for rescuer (or apply a low weight towards the profile of the sender).

In one embodiment, the false spam rescuer (125) determines whether or not the address of the sender has been spoofed via checking for the name of the sender in the address field for the sender. When the address field has the correct name of the sender, the address of the sender is less likely spoofed.

In one embodiment, the false spam rescuer (125) determines whether or not the address of the sender has been spoofed via matching the address of the sender with the address of the recipient. When there is a match (e.g., both the sender and the recipient of a spam message (217) has the same address), the sender address may have been spoofed.

In one embodiment, when the sender address is spoofed, the profile of the sender is not used for identifying a false positive. In some embodiments, the likelihood of the address of the sender being spoofed is used to reduce the weight towards the relevancy score of the corresponding profile.

In one embodiment, when the address of a spam message (217) is determined to be not spoofed, the false spam rescuer (125) uses one or more aspects of the profile (131) of the person at the address to determine whether the spam message (217) is a false positive. The false spam rescuer (125) may determine the likelihood of the spam message (217) being a false positive based on the number of emails the person has received from the user, the number of comrades the person has based on emails received from the user (e.g., the number of other persons who are also specified as recipients of the emails sent from the user to the person), the number of comrades the person has in general (e.g., the number of other persons who are also specified as recipients of the emails sent to the person, regardless the sender), and/or the number of reciprocated comrades the person has (e.g., the number of other persons who are also specified as recipients of the emails sent to the person and who have sent emails to the person).

In one embodiment, the false spam rescuer (125) may determine the likelihood of a spam message (217) being a false positive, based on a group of persons identified according to a characteristic of the address of the sender of the spam message (217). For example, when no profile is available for the person at the address of the sender of the spam message (217), the false spam rescuer (125) may identify the domain of the email address of the sender. The profiles of the persons having the same domain can be combined to generate a profile for the domain in identifying whether the spam message (217) is a false positive.

In one embodiment, the false spam rescuer (125) may also uses social network data in determining the likelihood of a spam message (217) being a false positive, such as the number of friends or connections that the person at the sender address of the spam message has in a social network, an average number of friends or connections each of the user's friends has in the social network, connectedness of the person in a social network graph, whether the person has an uploaded/public photo, the number of endorsements by others in a social network (e.g., in www.linkedlin.com), the number of wall posts the person has in a social network (e.g., in www.facebook.com), how long the user has been a member of the social network, etc.

In one embodiment, the false spam rescuer (125) determines the likelihood of a spam message (217) being a false positive based on one or more aspects of an address of the spam message (217), the profile of the person at the address, and/or the profile of a group of the persons at addresses having a common characteristic of the address. The false spam rescuer (125) uses a supervised learner to learn identifying false positives from training data base on a machine learning technique to improve the identification of false positives based on feedbacks from the user.

In one embodiment, the profile builder (119) scans the messages (115 and 117) to capture the addresses of the senders and recipients of the messages (115 and 117). Each of the captured addresses is stored in an index file. When one of those addresses is seen in a header that describes the recipients and senders, the score for the address is increased by a predetermined amount (e.g., 1). In some embodiments, the profile builder (119) further scans the body of the messages (115 and 117) to identify additional addresses.

In some embodiments, different weights/amounts are given to the score when the addresses are used in different fields (e.g., From, Reply-To, To, CC, and BCC fields of emails). For example, an amount of 3 may be given to the score when an address is found in a field that identifies the sender of the message (e.g., From or Reply-To fields of emails received by the user of the user terminal (101)); and an amount of 1 may be given to the score when the address is found in a field that identifies the recipient of the message (e.g., To, CC, and BCC fields of emails sent from the user of the user terminal (101)).

In some embodiments, the same amount is given to the score regardless of the type of fields in which the address is used (e.g., From, Reply-To, To, CC, and BCC fields of emails).

In some embodiments, the length of the elapsed time period since receipt of the message is further used to determine the amount given to the score. The occurrence of an address in a recent message can be given more weight than the occurrence of the address in a message received/sent earlier than the recent message.

Thus, after the messages (115 and 117) are processed, each of the addresses has a relevancy score. The higher the score, the more relevant the address is to the user of the user terminal (101).

In some embodiments, the relevancy score is computed from the data in the profile (131), such as the total number of messages received from the person (148), the total number of messages sent to the person (149), etc. In some embodiments, the number of messages are counted based on the types of fields in which the addresses appear and the time periods in which the messages are sent or received.

In one embodiment, the profile builder (119) further groups the addresses by the names of the corresponding persons. Each person having a name in the profile set (113) may have one or more addresses. In one embodiment, the scores for the addresses of the person are summed to generate a score for the person. Thus, the higher the score, the more relevant the person is to the user of the user terminal (101).

In one embodiment, the false positive spam messages (or all the spam messages (127)) are sorted according to the relevancy score of the sender address (or the relevancy score of the sender).

In some embodiments, when there are two or more matches between a spam message and the profile set, the relevancy score may be added to generate a relevancy score for the message. For example, when the spam message has a sender and a recipient found in the profile set (113), the relevancy scores of the sender and the recipient can be added to generate a score for the spam message to indicate the relevancy of the message to the user. For example, when the spam message has a recipient and a second person referenced in the message body and the recipient and the second person are found in the profile set (113)), the sum of the relevancy scores of the recipient and the second person can be used as the relevancy score of the spam message.

In some embodiments, the relevancy score of different types of addresses or persons found in a spam message are given different weights towards the relevancy score of the message. For example, the sender address may be given more weight than a recipient address; and a recipient address may be given more weight than an address mentioned in the body of the message.

In some embodiments, the false spam rescuer (125) sorts the spam messages (127) based on the relevancy scores of the spam messages (127) and/or flags some of the spam messages (127) as false positive when the flagged messages have relevancy scores higher than a threshold.

While some of the embodiments are discussed here in the context of email messages, the techniques disclosed here can also be applied to instant messaging, text messaging, receiving phone calls, etc. For example, the spam filter (129) may be used to selectively block connection requests for instant messaging or phone conversation; and the false spam rescuer (125) can be used to identify false positives in spam filtering.

In some embodiments, the same profile set (113) can be used to improve spam filtering for different types of communications. Further, the profile builder (119) may build the profile set (113) based on different types of communications, such as instant messages, phone calls, faxes, text messages, emails, etc.

In some embodiments, the user terminal (101) may include different communication components for different types of communications, such as email, instant messages, text messages, phone calls, etc. The profile builder (119) may build the profile set (113) based on communications handled by the different communication components; and the false spam rescuer (125) can use the profile set (113) to improve spam filtering in the different types of communications.

In some embodiments, the relevancy score is computed for the person without considering the type of communications. In other embodiments, the addresses having the same type as the address used in the spam message are given more weight than other types of addresses. For example, when ranking the persons for improving spam filtering of instant messages, the addresses for instant messaging may be given more weight than addresses for other types of communications, such as email, phone calls, etc.

In one embodiment, the user terminal (101) is configured to receive the messages (115) from different accounts (e.g., associated with different addresses). The profile builder (119) uses the messages received in the different accounts of the user to build the unified profile set (113); and the false spam rescuer (125) uses the profile set (113) to improve spam filtering.

In one embodiment, the user may use different user terminals to receive messages in different accounts and/or messages of different types. The profile builders (119) of the user terminals may share with each other the profile data to build the unified profile set (113).

In some embodiments, the profile builders (119) of the user terminals of different users (e.g., friends and family) may be configured to share with each other the profile data to build the unified profile set (113).

In some embodiments, the profile builders (119) of the user terminals of different users (e.g., friends and family) may be configured to each provide a portion of their profile data (e.g., marked by the corresponding users for sharing) to build the profile set (113) for the respective user terminal (101).

In one embodiment, the false spam rescuer (125) identifies false positives based on the profile set (113) stored on the user terminal (101). Alternatively, the false spam rescuer (125) may use the profile set (113) built by a profiler builder (119) on a server. For example, the false spam rescuer (125) may access the profile set (113) on a server via a Lightweight Directory Access Protocol (LDAP). Further, the profile set (113) may or may not be built automatically via a profile builder (119) scanning the messages received or sent by the user of the user terminal (101). For example, an organization (e.g., a company) may store profile data of users on an LDAP server (e.g., as an internal directory); and the false spam rescuer (125) may identify the false positives using the internal directory.

For example, when a spam message (127) appears to be from a user on the internal directory, the spam message (127) may be identified as a false positive.

For example, a spam message (127) appears to be from a user on the internal directory and having a predetermined relation with the user of the user terminal (101) (e.g., being the in the same department as the user of the user terminal (101)), the spam message (127) can be identified as a false positive.

For example, a spam message (127) appears to be from a user on the internal directory and satisfying a predetermine criterion (e.g., holding a position in the company above a predetermined rank, or having a position higher than the user of the user terminal (101)), the spam message (127) can be identified as a false positive.

In some embodiments, the false spam rescuer (125) identifies false positives using various profile information, including the profile set (113) on the terminal (101), a profile set hosted on a server, an internal directory of an organization hosted on an LDAP server, etc.

Figure 8:
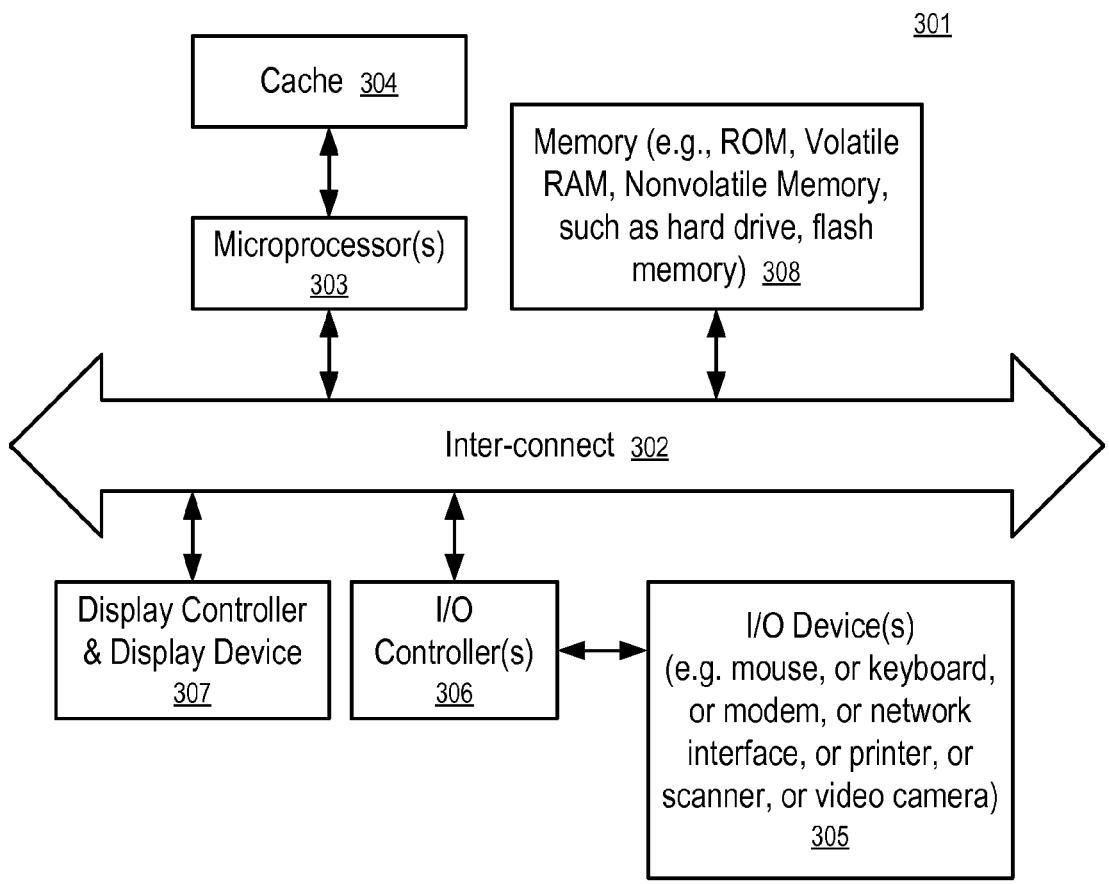
FIG. 8 shows a data processing system, which can be used in various embodiments.

FIG. 8 shows a data processing system, which can be used in various embodiments. While FIG. 8 illustrates various components of a computer system, it is not intended to represent any particular architecture or manner of interconnecting the components. Some embodiments may use other systems that have fewer or more components than those shown in FIG. 8.

In one embodiment, the user terminal (101) can be implemented as a data processing system, with fewer or more components, as illustrated in FIG. 8. When one or more components of the user terminal (101) are implemented on one or more remote servers, the servers can be implemented as a data processing system, with fewer or more components, as illustrated in FIG. 8.

In FIG. 8, the data processing system (301) includes an inter-connect (302) (e.g., bus and system core logic), which interconnects a microprocessor(s) (303) and memory (308). The microprocessor (303) is coupled to cache memory (304) in the example of FIG. 8.

The inter-connect (302) interconnects the microprocessor(s) (303) and the memory (308) together and also interconnects them to a display controller, display device (307), and to peripheral devices such as input/output (I/O) devices (305) through an input/output controller(s) (306).

Typical I/O devices include mice, keyboards, modems, network interfaces, printers, scanners, video cameras and other devices which are well known in the art. In some embodiments, when the data processing system is a server system, some of the I/O devices, such as printer, scanner, mice, and/or keyboards, are optional.

The inter-connect (302) may include one or more buses connected to one another through various bridges, controllers and/or adapters. In one embodiment, the I/O controller (306) includes a USB (Universal Serial Bus) adapter for controlling USB peripherals, and/or an IEEE-1394 bus adapter for controlling IEEE-1394 peripherals.

The memory (308) may include ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, various functions and operations may be described as being performed by or caused by software code to simplify description. However, those skilled in the art will recognize that what is meant by such expressions is that the functions result from execution of the code/instructions by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a tangible machine readable medium includes any apparatus that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computer implemented method, comprising:
scanning, by a computer system, a plurality of sent or received messages of a user to identify addresses of a plurality of persons;
extracting profile data for the persons from the messages, the profile data including one or more of a name of person to whom the user sent a message and a name of a person from whom the user received a message, wherein at least a portion of the profile data is extracted from bodies of the messages;
storing the addresses in a plurality of profiles, each profile being for a respective one of the plurality of persons;
adding the extracted profile data to the profiles, wherein the profile data includes names of the persons and phone numbers for the persons;
querying, using the extracted profile data as search criteria, at least one server to obtain additional information regarding the persons wherein the at least one server includes at least one of: a web search engine, an online directory, a social network server, a business website, a personal website, a media sharing website, a map and direction website, an online retailer, a travel website, a location website, and another type of server;
adding the additional information to the profiles;
updating, by the computer system, the plurality of profiles as new messages of the user are received;
scanning, by the computer system, a set of messages that have been previously classified by a spam filter as spam;
determining, by the computer system, one or more false positive spam messages from the set of messages classified as spam, the determining comprising comparing addresses and names used in the set of messages with addresses and names in the plurality of profiles to select the one or more false positive spam messages out of the set of messages; and
presenting a list to identify the one or more false positive spam messages to the user.

2. The method of claim 1, wherein the presenting comprises highlighting the one or more false positive spam messages when a list of the set of messages that are classified as spam is presented.

3. The method of claim 1, further comprising:
moving the one or more false positive spam messages out of the set of messages that are classified as spam.

4. The method of claim 3, wherein the moving is in response to a single command from a user of the computer.

5. The method of claim 3, wherein the moving is in response to the computer receiving the one or more messages and determining that the one or more messages are false positive in spam filtering.

6. The method of claim 4, wherein the presenting comprises highlighting the one or more messages when a list of incoming messages is presented on the computer.

7. The method of claim 1, wherein each of the sent or received messages is one of: an email, an instant message, and a text message.

8. The method of claim 1, wherein the computer is a server remote to a user terminal on which the list is displayed.

9. The method of claim 1, wherein the computer is a user terminal configured to receive incoming messages for the user, send outgoing messages from the user, and display the list.

10. The method of claim 1, wherein the one or more false positive spam messages are selected out of the set of messages classified as spam, when one or more addresses used in each of the one or more false positive spam messages are in the stored addresses.

11. The method of claim 1, wherein the scanning of the plurality of messages comprises scanning both sent and received messages to identify the addresses.

12. The method of claim 11, wherein the received messages and the sent messages are in a first account of the user; the set of messages classified as spam are in a second account of the user; the first account is associated with a first address of the user; and the second account is associated with a second address of the user.

13. The method of claim 1, wherein the determining of the one or more false positive spam messages comprises communicating via a lightweight directory access protocol to identify the one or more false positive spam messages that at least have addresses listed on a server.

14. A system comprising:
a processor; and
memory coupled to the processor and storing instructions that, when executed by the processor, cause the system to:
scan a plurality of sent or received messages of a user to identify addresses of a plurality of persons;
extract profile data for the persons from the messages, the profile data including one or more of a name of a person to whom the user sent a message an a name of a person from whom the user received a message, wherein at least a portion of the profile data is extracted from bodies of the messages;
store the addresses in a plurality of profiles, each profile being for a respective one of the plurality of persons;
add the extracted profile data to the profiles, wherein the profile data includes names of the persons and phone numbers for the persons;
query, using the extracted profile data as search criteria, at least one server to obtain additional information regarding the persons wherein the at least one server includes at least one of: a web search engine, an online directory, a social network server, a business website, a personal website, a media sharing website, a map and direction website, an online retailer, a travel website, a location website, and another type of server:
add the additional information to the profiles;
update the plurality of profiles as new messages of the user are received;
scan a set of messages that have been previously classified by a spam filter as spam;
determine one or more false positive spam messages from the set of messages classified as spam, the determining comprising comparing addresses and names used in the set of messages with addresses and names in the plurality of profiles to select the one or more false positive spam messages out of the set of messages; and
present a list to identify the one or more false positive spam messages to the user.

15. A non-transitory machine readable storage media storing a set of instructions, that, when executed by a computer system, cause the computer system to:
scan a plurality of sent or received messages of a user to identify addresses of a plurality of persons;
extract profile data for the persons from the messages, the profile data including one or more of a name of person to whom the user sent a message and a name of a person from whom the user received a message, wherein at least a portion of the profile data is extracted from bodies of the messages;

store the addresses in a plurality of profiles, each profile being for a respective one of the plurality of persons;

add the extracted profile data to the profiles, wherein the profile data includes names of the persons and phone numbers for the persons;

query, using the extracted profile data as search criteria, at least one server to obtain additional information regarding the persons wherein the at least one server includes at least one of: a web search engine, an online directory, a social network server, a business website, a personal website, a media sharing website, a map and direction website, an online retailer, a travel website, a location website, and another type of server;

add the additional information to the profiles;

update the plurality of profiles as new messages of the user are received;

scan a set of messages that have been previously classified by a spam filter as spam;

determine one or more false positive spam messages from the set of messages classified as spam, the determining comprising comparing addresses and names used in the set of messages with addresses and names in the plurality of profiles to select the one or more false positive spam messages out of the set of messages; and present a list to identify the one or more false positive spam messages to the user.

16. The storage media of claim 15, wherein the memory further stores instructions to cause the computer system to determine a relevancy score for each of the profiles, and wherein the filtering comprises using the relevancy scores of the profiles to filter the spam messages.

* * * * *